United States Patent [19]

Isaka et al.

[11] 4,293,608

[45] Oct. 6, 1981

[54] OLEFIN PACKAGING LAMINATE

[75] Inventors: Tsutomu Isaka, Inuyama; Saburoh Kumada, Kawanishi, both of Japan

[73] Assignee: Toyo Baseki Kabushiki Kaisha, Japan

[21] Appl. No.: 84,498

[22] Filed: Oct. 15, 1979

[51] Int. Cl.³ .............................................. B32B 27/08
[52] U.S. Cl. .................................... 428/220; 428/349; 428/516; 428/517; 428/910; 428/913
[58] Field of Search ............... 428/516, 517, 349, 910, 428/913, 220

[56] References Cited

U.S. PATENT DOCUMENTS 3,754,063  8/1973  Schirmer ............................ 428/516
4,117,193  9/1978  Tsuchiya et al. .................... 428/516

Primary Examiner—Marion McCamish
Attorney, Agent, or Firm—Jones, Tullar & Cooper

[57] ABSTRACT

A heat sealable packaging material comprising (A) a stretched base layer formed of a propylene polymer and (B) a stretched surface layer formed of a blend of a propylene-ethylene copolymer and a $C_4$–$C_{10}$ α-olefin-propylene copolymer in a weight proportion of 20:80 to 94:6 by weight on at least one surface of said base layer.

19 Claims, 8 Drawing Figures

OLEFIN PACKAGING LAMINATE

The present invention relates to packaging materials for articles. More particuarly, it relates to packaging materials having excellent properties such as transparency, gloss, melt-adhesion at low temperature, lubricity in sliding, separability from a hot plate, antistatic properties, etc. and are useful for repackaging a single article or a mass of articles previously packed in a case or the like in a sealed state.

In recent years, advanced requirements have been raised for the external packages of foodstuffs, tobacco, industrial articles and daily miscellaneous goods. For example, in respect to the packaging of foodstuffs, the external packaging material requires to have eye-vision characteristics (e.g. high transparency, high gloss), basic characteristics (e.g. moisture-proof properties, fragrance-keeping properties, insect damage preventing properties, oxygen excluding properties) and characteristics in packaging work necessary in mechanization of packaging by an automatic packaging system (e.g. sealability of heat-bonded portions, sufficient bond adhesion strength, prevention of insufficient air-tightness caused by wrinkles in packaging, prevention of poor appearance, minimization of defect rates in automatic packaging). Further odor in the packaging material is undesirable from a sanitary viewpoint, so that intense efforts are made by the industry to reduce solvents remaining in the packaging material.

On the other hand, automatic packaging machines have been operating at a higher speed with a higher efficiency. For use on such automatic packaging machines, the packaging materials are required to have the following properties: thermal adhesion at low temperature; lubricity between the packaging material and the metal guide portion of the automatic packaging machine; separability and slidability between the packaging material and the hot plate; flaw preventing properties on sliding between the packaging material and the packaging machine; automatic applicability of the packaging material to the automatic packaging machine, etc.

As packaging materials having heat seal properties, there have been proposed (1) a coating film produced by applying on a base film a low melting point substance dissolved in an organic solvent, (2) a single film obtained by admixing polypropylene with a low melting point polymer and shaping the mixture into a film, (3) a laminated film obtained by laminating a low melting point polymer film on a base film in such a manner that the low melting point polymer film forms a heat-seal surface, or (4) a single film obtained by admixing polypropylene with a low molecular weight thermoplastic resin and shaping the blend into a film. However, there are the following problems: the films obtained by the coating method are inferior in seal-strength in a hot state and unsuitable for a seal-package as in the present invention. In addition, it is difficult to fully eliminate the remaining solvent on the coating surface. The films obtained by admixing polypropylene with a low melting point polymer and shaping the mixture into a film are insufficient in sealability at low temperature and in transparency. Besides, the film is soft and its firmness and resilience are small so that its automatic suppliability is unstable and continuous package by the aid of an automatic packaging machine is difficult. Various attempts have been made on a process of laminating a low melting point polymer on a base film, wherein there arise such troubles as melt adhesion of the polymer to the roll during stretching by a heat roll or scratches on the film surface in two-stage biaxial orientation. In practice, therefore, cold stretching is necessitated. Under such conditions, surface scratches may be reduced, but voids are caused by stretching so that a transparent film is unobtainable. To overcome such drawbacks, there has been adopted a method in which a base film is stretched in the machine direction by a heat roll, said low melting point polymer is laminated on one surface or both surfaces of the base film and then the laminated film is stretched by a tenter in a manner not to be in contact with a surface which is susceptible to melt-adhesion (cf. U.S. Pat. No. 3,671,383). However, since the low melting point polymer layer, which is made by monoaxial stretching, is more susceptible to damage both thermally and mechanically and is apt to lose transparency. The film incorporating a low molecular weight thermoplastic resin can have a seal strength necessary for overlapping even at low temperature, but has a defect of loss in strength when the seal portion is kept at high temperature so that it is difficult to form a package having excellent sealability. Since the film is kept at high temperature immediately after the heat-sealing, weak seal strength under such a state means unapplicability to seal packaging.

As the result of an extensive study, it has now been found that the use of certain specific polymers in combination can provide a seal packaging material having high transparency and gloss as well as excellent antistatic properties and heat sealability.

According to the present invention, there is provided a packaging material having excellent thermal adhesion sealability comprising (A) a stretched base layer formed of a propylene polymer and (B) a stretched surface layer formed of a blend of a propylene-ethylene copolymer and a $C_4$-$C_{10}$ α-olefin-propylene copolymer in a weight proportion of 20:80 to 94:6 by weight on at least one surface of said base layer.

The propylene polymer for the base layer (A) is a polymer mainly comprising propylene and having a melting point of 140° C. or higher, preferably 150° C. or higher. Specific examples thereof are isotactic polypropylene having an isotactic index of 85% by weight or higher, a copolymer of ethylene and propylene having an ethylene content of 7% by weight or lower, a copolymer of propylene and a $C_4$-$C_6$ α-olefin having a propylene content of 90% by weight or higher, etc. The propylene polymer is desired to have an intrinsic viscosity of 1.6 to 3.0 dl/g (tetraline solution at 135° C.), particularly 1.8 to 2.5 dl/g.

On at least one surface of the base layer (A), there is provided the surface layer (B) formed of a blend of a propylene-ethylene copolymer and a $C_4$-$C_{10}$ α-olefin-propylene copolymer in a proportion of 20:80 to 94:6. The surface layer (B) may be either monoaxially or biaxially stretched. The surface layer (B) is laminated on either one face or both surfaces of the base layer (A) and firmly bonded. Their combination may be thus either A/B or B/A/B.

The propylene-ethylene copolymer to be used in the blend for the surface layer (B) has an ethylene content within a range of 0.5 to 10% by weight. Preferred is a polymer having a melt index of 0.5 to 10 (g/10 min). Particularly preferred is a random copolymer having an ethylene content of 3.6 to 10% by weight, with its melt index of 1.0 to 6 (g/10 min). When the ethylene content is less than 0.5% by weight, the polymer can hardly be mixed evenly with a $C_4$-$C_{10}$ α-olefin-propylene copolymer and is inferior in transparency and gloss. In an extreme case, it becomes a semi-mat, translucent film. When the ethylene content is more than 10% by weight, the lubricity under a heated state is deteriorated, and wrinkles and scratches are formed on the resultant package. In the case that a laminated film with the surface layer (B) is desired to have heat sealability even after subjected to electron beam treatment, the ethylene content is to be kept from 3.6 to 10% by weight.

The $C_4$-$C_{10}$ α-olefin-propylene copolymer in the blend is a copolymer which may comprise units of propylene and units of $C_4$-$C_{10}$ α-olefin (e.g. butene-1, pentene, hexene) respectively in amounts of 70 to 95% by weight and 30 to 5% by weight. When the propylene content is less than 75% by weight, the product has poor transparency and gloss and a high coefficient of friction at high temperature (i.e. 1.4 or more) so that the film or sheet produced has scratches and wrinkles caused by insufficient sliding in heat sealing, making it impossible to obtain a sealed package by the aid of the automatic packaging machine. Further, in case of sequential biaxial stretching, clinging or melt-adhesion to a heat-stretching roll is apt to be caused, thus making it impossible to obtain commercially a smooth package packed in a film or sheet having an excellent appearance without flaws. When the propylene content is larger than 95% by weight, the film shows lower heat-sealing properties, and especially heat sealing at low temperature and at high speed becomes difficult. As it is necessary to elevate the heat-sealing temperature, excellent heat sealing by thermal shrinkage is not obtainable. This is apparent from the example as shown in FIG. 7 of the accompanying drawings.

In order to enhance the advantageous physical characteristics of the packaging material of the invention, various optional measures may be adopted. One of such measures is to incorporate in the propylene polymer for the base layer (A) a low molecular weight thermoplastic resin. The low molecular weight thermoplastic resin may be blended into the propylene polymer in an amount of 3 to 25% by weight on the weight of the propylene polymer. The low molecular weight thermoplastic resin should be compatible with the propylene polymer, have a softening point (determined according to ASTM D-36-26) of 70° to 150° C., show a thermal stability at a temperature of 150° C. or higher and preferably possess a melt viscosity of about 20,000 cp or lower at 200° C. The term "compatible" herein used is intended to mean that, when the propylene polymer is blended with the low molecular weight thermoplastic resin, no separation between those materials occurs. The term "thermal stability" is intended to mean that permanent change is not caused in the properties of the resin even after heating at a designed temperature for 1 hour in the presence of the air. The melt viscosity is determined according to the method as described in ASTM D-1824-66 by the aid of a Brookfield viscometer at a designed temperature.

Examples of the low molecular weight thermoplastic resins are hydrocarbon resins, rosins, dammers, phenol resins, chlorinated aliphatic hydrocarbon waxes, chlorinated polynuclear aromatic hydrocarbons, etc.

The term "hydrocarbon resin(s)" covers hydrocarbon polymers derived from coke oven gas, coal tar distillates, decomposed or deep-decomposed petroleum materials, substantially pure hydrocarbon materials and turpentine oil. Typical examples of the hydrocarbon resin are cumarone-indene resins, petroleum resins, styrene resins, cyclopentadiene resins, terpene resins, etc. These resins are described in Kirk-Othmer's "Encyclopedia of Chemical Technology", Second Edition, Vol. 11, 242-255 (1966). The cumarone-indene resins are hydrocarbon resins recovered from coke oven gas or obtained by polymerization of resin-forming substances present in coal tar distillates, phenol-modified cumarone-indene resins and their derivatives. These resins are described in the said Encyclopedia, Second Edition, Vol. 11, 243-247. The petroleum resins are hydrocarbon resins obtained by polymerization of deep-decomposed petroleum materials in the presence of a catalyst. These petroleum materials contain usually a mixture of resin-forming substances such as styrene, methylstyrene, vinyltoluene, indene, methylindene, butadiene, isoprene, piperylene and pentylene. These resins are described in the said Encyclopedia, Second Edition, Vol. 11, 248-250. The styrene polymers are low molecular weight homopolymers of styrene and copolymers of styrene with other monomers such as α-methylstyrene, vinyltoluene and butadiene. The cyclopentadiene resins are cyclopentadiene homopolymers and copolymers derivated from coal tar distillates and separated petroleum gas. These resins are prepared by keeping cyclopendadiene-containing materials at high temperature for a considerably long time. Depending on the reaction temperature, dimers, trimers or high polymers may be obtained. These resins are described in the said Encyclopedia, Second Edition, Vol. 11, 250-251. The terpene resins are polymers of terpenes, i.e. hydrocarbons of the formula: $C_{10}H_{16}$ present in almost all of essential oils and oil-containing resins of plants and phenol-modified terpene resins. Specific examples of terpenes are α-pinene, β-pinene, dipentene, limonene, myrcene, bornylene, camphene and similar terpenes. These resins are described in the said Encyclopedia, Second Edition, Vol. 11, 252-254.

The term "rosin(s)" covers natural resinous substances present in oil-containing resins of pine trees, rosin esters, modified rosins (e.g. fractionated rosins, hydrogenated rosins, dehydrogenated rosins) and other similar substances. These substances are described in the said Encyclopedia, Second Edition, Vol. 17, 475-505.

The term "dammar(s)" is intended to mean a colorless or yellow substance present in plants such as kanari and any similar substance thereto. These substances are described in "Encyclopedia Chimica" (Kyoritsu Shuppan), Vol. 5, 776 (1961).

The term "phenol resin(s)" covers the reaction products between a phenol and an aldehyde. Examples of the phenol are phenol, cresol, xylenol, p-tert-butylphenol, p-phenylphenol, etc. Examples of the aldehyde are formaldehyde, acetaldehyde, furfuralaldehyde, etc. These resins are described in Kirk-Othmer's "Encyclopedia of Chemical Technology", Second Edition, Vol. 15, 176-207.

The chlorinated aliphatic hydrocarbon waxes are chlorinated paraffin waxes (usually called "chlorinated waxes"). Typical ones contain about 30 to 70% by weight of chlorine.

The chlorinated polynuclear aromatic hydrocarbons are chlorinated hydrocarbons containing at least two aromatic rings such as chlorinated biphenyl, chlorinated terphenyl and their mixtures. Typical ones contain about 30 to 70% by weight of chlorine.

The base layer (A) may additionally contain other polymers in such amounts as not deteriorating its quality. It may also contain any other additive(s) such as an antistatic agent, a lubricant or an anti-blocking agent and the like. The effects of these additives would be greater when incorporated into the base layer (A) than when incorporated into the surface layer (B). In case of incorporating an antistatic agent, it may be used in an amount of 0.5 to 3 parts by weight to 100 parts by weight of the total amount of the propylene polymer and the low molecular weight thermoplastic resin. A lubricant or an anti-blocking agent is usually employed in an amount of 0.1 to 3 parts by weight to 100 parts by weight of the said total amount.

As the lubricant, there may be used higher aliphatic acid amides, higher aliphatic acid esters, waxes, metallic soaps, etc. Examples of the anti-blocking agents are inorganic additives (e.g. silica, calcium carbonate, magnesium silicate, calcium phosphate), nonionic surfactants, anionic surfactants, incompatible organic polymers (e.g. polyamides, polyesters, polycarbonates), etc.

As the antistatic agent, there may be used any one which is blendable into the propylene polymer; typical examples include the following compounds:

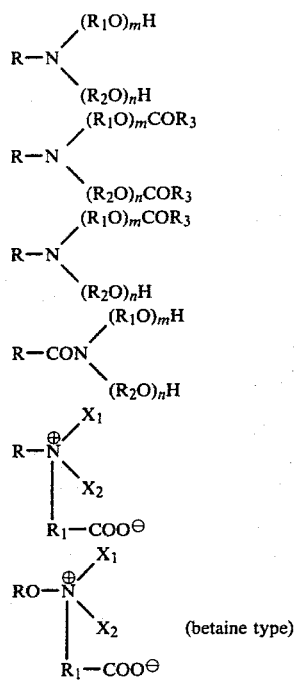

wherein R and $R_3$ are each a monovalent aliphatic group having 12 to 22 carbon atoms, $R_1$ and $R_2$, being the same or different, are each a divalent hydrocarbon group having 2 to 4 carbon atoms, $X_1$ and $X_2$ are each a saturated hydrocarbon group having not more than 22 carbon atoms and optionally bearing hydroxyl or alkoxy or a group of the formula: $-(R_4-O)_pH$ (in which $R_4$ is a divalent hydrocarbon group having 1 to 3 carbon atoms and p is an integer of not more than 20), or they may be taken together to make a ring and m+n is an integer of 0 to 8. There may be also used monoglycerides of fatty acid esters, polyoxyethylene alkyl phenyl ether, etc. Co-use of more than two kinds of these antistatic agents is specially effective.

In automatic packaging, it is disadvantageous for obtaining a sealed package that supply of a packaging material to a product to be packed is not effected in a straight and constant manner because of troubles in the packaging material-supplying portion of an automatic packaging machine such as adhesion of the film due to static electricity, winding of the film round the edge of the cutter and pulling of the film toward the guide plate by static attraction. Thus, consideration must be given to the prevention of static electricity both in stationary state and during rubbing. In this respect, it has been found that the phenomenon of static electricity in the automatic packaging machine can be prevented to a great extent by incorporation of an antistatic agent into the base layer (A).

Particularly by incorporation of an antistatic agent and a low molecular weight thermoplastic resin into the base layer (A), the antistatic performance is enhanced and a remarkable improvement of antistatic effect is exhibited. The use of the antistatic agent in an excessive amount is, however, not favorable since it causes lowering of the heat sealability by change over a long period of time, whitening at the surface by bleeding, stick blocking at high temperature, etc. To the contrary, when the use of the antistatic agent is excessively small in amount, antistatic effects can hardly be obtained.

For prevention of the occurrence of static electricity during automatic packaging, at least one surface or both surfaces of a composite film consisting of the base layer (A) and the surface layer(s) (B) may be subjected to an electron beam treatment such as corona discharge treatment or glow discharge treatment so that the improvement of the antistatic property and slidability will be attained by the use of an antistatic agent in a minimum necessary amount. When, however, the electron beam treatment is applied, the heat sealability of the composite film, particularly at low temperature, is remarkably deteriorated, and an increase in the intensity of the electron beam treatment will often result in loss of the heat sealability not merely at low temperature but also at high temperature. In order to improve the antistatic property and slidability without the depression of the heat sealability, the use of a polymeric mixture comprising a low molecular weight thermoplastic resin for the surface layer (B) and the application of electron beam treatment thereto are recommended. Specially useful low molecular weight thermoplastic resins to this end are hydrocarbon resins, rosins, dammars, phenol resins, etc.

The antistatic property may be represented, for instance, by an intrinsic resistance at surface, and it is usually $10^{12-13}$ Ω.cm or less. When the film thickness is small, a lower intrinsic resistance is required. If it is from $10^8$ to $10^{10}$ Ω.cm, it will be applicable to almost all kinds of automatic packaging machines.

The extent of the electron beam treatment is desirably in the range of 30.5 to 58 dyne/cm when measured, for example, with the wet tension.

While the composite film of the present invention has high transparency and high gloss, it is desirable, in order to impart gloss to the film and provide antistatic properties by electron beam treatment to provide the satisfactory film properties and yet not to impair the heat-sealability, especially the sealability at low temperature, to incorporate a low molecular weight thermoplastic resin into the surface layer (B) in an amount of 3 to 25% by weight based on the combined amount of the blend and the low molecular weight thermoplastic resin.

When the amount of the low molecular weight thermoplastic resin is smaller than 3% by weight, the transparency and the gloss are not improved. To the contrary, when the amount of the low molecular weight thermoplastic resin is larger than 25% by weight, the transparency and the gloss are deteriorated and tucking power at high temperature is lowered to reduce the grade of seal packaging.

In order to provide further prevention of the wrinkles at the seal area on an automatic packaging machine by lowering the coefficient of friction at high temperature, it is desirable to use a silicone oil in the following proportions, usually in a proportion of 0.01 to 0.15 part by weight to 100 parts by weight of the blend for the surface layer (B). Examples of the silicone oil are polydimethylsiloxane, polymethylphenylsiloxane, olefin-modified silicone, polyether (e.g. polyethylene glycol, polypropylene glycol)-modified silicone, olefin/polyether-modified silicone, epoxy-modified silicone, amino-modified silicone, alcohol-modified silicone, etc. Among them, olefin-modified silicone, polyether-modified silicone and olefin/polyether-modified silicone are particularly preferable.

The silicone oil improves the coefficient of friction of the composite film at the heated state, reduces the slide resistance caused during hot plate seal by an automatic packaging machine and thus prevents generation of wrinkles, which makes it possible to obtain a composite film having a beautiful appearance, a high sealing ability and an excellent close-fitting to a product to be packaged. Further, decrease of gloss due to sliding can be prevented to obtain a sealed portion with beautiful appearance. By the use of the silicone oil, the friction coefficient at high temperature in heat sealing while sliding can be decreased to 1.4 or smaller. For obtaining sufficient effect, the silicone oil is desired to possess a viscosity of 50 to 10,000 cs, preferably 50 to 300 cs.

The effect of the silicone oil can be further increased by the combined use of an ethylene oxide-addition product of castor oil having a softening point of 70° to 140° C., an oxidized synthetic wax, a higher fatty acid alkyl ester, a polyalcohol alkylate-ethylene oxide addition product, a fatty acid amide, etc. These compounds are usually used in an amount of 1 to 300 parts by weight, preferably 50 to 300 parts by weight, to 100 parts by weight of the silicone oil. The combined use of these compounds together with the silicone oil prevents stick-slip at a temperature of room temperature to 100° C. which is apt to occur by the sole use of the silicone oil and improves the lubricity between the film and various metal guide plates of the automatic packaging machine to prevent bad packages. Further, the lubricity at high temperature under elevated pressure can be improved, the friction coefficient at high temperature being decreased to 1.4 or smaller, thus the use of such oil and additive is extremely important for obtaining an excellent sealed package according to the invention. Although the silicone oil and the said additives can give these advantageous effects, they are apt to decrease the heat sealing property of the film or sheet and the transparency, and because of such tendency to decrease the heat sealing property at low temperature, it is required in practice to effect heat-sealing at relatively high temperature.

Incorporation of a lubricant or an anti-blocking agent into the surface layer (B) in an amount of 0.1 to 3 parts by weight to 100 parts by weight of the amount of the blend and, when used, the low molecular weight thermoplastic resin for the surface layer (B) is effective in improvement of the lubricity and the anti-blocking property of the composite film of the invention. Specific examples of these additives may be the same as hereinbefore stated in connection with their use for the base layer (A). It is also possible to improve the antistatic property by incorporation of the antistatic agent as stated in connection with the base layer (A) in an amount of 0.5 to 3 parts by weight to 100 parts by weight of the amount of the blend and, when used, the low molecular weight thermoplastic resin.

The thickness of the composite film of the invention as the packaging material may be decided depending on the use of the sealed package. Usually, a thickness of 5 to 150 microns, particularly of 15 to 60 microns, is adopted. The total thickness of the surface layers (B) may be from 0.2 to 50% to the whole thickness of the composite film as the packaging material. In preparing a sealed package by the aid of an automatic packaging machine, the absolute value of the surface layer (B) becomes important, in addition to the said thickness ratio. The desirable thickness of each surface layer (B) is 0.2 to 10 microns, particularly 0.2 to 3 microns on application to a cigarette hold type automatic packaging machine.

As the mechanism of operation of the automatic packaging machine, the following two processes are known: the process of thermal adhesion with sliding under heating and elevated pressure and the process of thermal adhesion with pushing under heating (ordinary heat-seal system). In case of the process of thermal adhesion with sliding under heating, the thickness of each surface layer (B) is desired to be 0.2 to 3 microns. In case of the process of thermal adhesion with pushing under heating, e.g. in automatic packaging machine of form and fill type, the thickness of each surface layer (B) is preferred to be 0.7 to 10 microns.

The packaging material of the invention is stretched in at least one direction. Preferably, the film for the base layer (A) is biaxially stretched and the film for the surface layer (B) is the one as uniaxially or biaxially stretched.

For instance, the composite film obtained by any one of the following methods may be stretched at least in one direction, or preferably in two directions, to give the packaging material of the invention: the coextrusion method in which the base layer (A) and the surface layer (B) are extruded from separate extruding machines to form a compound stream in a melted state which is then subjected to extrusion shaping; the laminating method in which the layers are extruded separately in a melted state and the extruded products are laminated before solidification by cooling; the adhesion method in which one of the layers is shaped in film or sheet form by solidification by cooling and the other layer is piled thereon in a melt-extruded state. Further, for instance, a film(s) for the surface layer (B) may be piled or melt-extruded onto at least one surface of a uniaxially stretched film for the base layer (A), followed by stretching into a direction perpendicular to the direction into which the uniaxially stretched film has been stretched.

The packaging material of the invention may be in the form of a flat film or a ring film.

In the present invention, an effective sealing material is provided where the material is stretched at least uniaxially, preferably biaxially. It is based on the characteristics that the base layer (A) is more thermally stable to biaxial stretching and the surface layer (B) does not show any loss of its sealing property even though it is subjected to biaxial orientation.

A characteristic feature of the packaging material of the invention is present in that it can be prepared by the two-stage biaxial orientation method in which a heating roll is used in the longitudinal stretching, though the preparation can be effected more easily by the simultaneous biaxial stretching method. In case of the two-stage biaxial orientation, a strong binding power is obtained between the layers to afford a packaging material with excellent heat seal strength. In addition, the preparation of the composite film can be effected economically.

The preferable conditions for obtaining the packaging material of the invention as stretched film are explained in the following description. In case of uniaxial stretching, the material is stretched 3.5 to 10 fold in a machine direction or a transverse direction. The stretching temperature is usually 100° to 160° C. in roll stretching or 140° to 165° C. in tender stretching. In the present invention, in case of subjecting the film to the two-stage biaxial orientation, stretching may be effected 3.5 to 10 fold, preferably 3.8 to 7.5 fold, into a machine direction and 4 to 12 fold, preferably 6 to 9 fold, into a transverse direction. In case of the simultaneous biaxial orientation, the temperature is 140° to 165° C. In the two-stage biaxial orientation, the temperature at the first step is 100° to 160° C., preferably 110° to 130° C., and the temperature at the second step is 140° to 165° C., preferably 145° to 160° C. Heat setting is effected at a temperature higher than the said stretching temperature, usually at 140° to 167° C., for 1 second to 1 minute. The resultant composite films are usually subjected to melt adhesion under heating, the surface layers (B) being opposite to each other. In case of necessity, melt adhesion under heating between the base layer (A) and the surface layer (B) may be effected.

The packaging material of the present invention may be used for packaging of various articles by conventional procedures adopting heat sealing. An automatic packaging machine as commonly used has a packing speed of 30 to 500 packages/min. The packaging speed of the most popular one is from 50 to 300 packages/min. In those conventional machines, the heat seal temperature using the packaging material of the invention may be usually from 120° to 190° C., preferably from 130° to 180° C., although it depends on the packaging speed, the film thickness, etc. The heating time is usually from 0.5 to 2.0 seconds, particularly from 0.2 to 1.0 second, though it is greatly varied with repetition of heating.

When heat sealing is effected at a high temperature and at a high speed by the use of an automatic packaging machine, many conventional films or sheets are apt to be damaged on their surfaces. In addition, a flat seal surface is hardly obtainable due to the production of thermal shrinkage. Different from films made of polyvinyl chloride, the biaxially stretched films made of polypropylene can not attain even shrinkage because of polypropylene's high crystallinity and melting point. In case of biaxially stretched films made of polypropylene, the part brought into contact with a hot plate is readily shrunk, and, depending on the condition of contact, only an uneven seal surface may be obtainable, thus making it difficult to effect seal packaging.

The packaging material of the invention has excellent antistatic properties and heat sealability at low temperature and can be used in conventional automatic packaging machines with ease. When the sealed product is kept at 100° C., the retention of the seal strength is more than 60%, frequently more than 80%. The friction coefficient at 120° C. is less than 1.4. Due to these characteristics, packaging can be accomplished with less production of wrinkles and scratches.

The packaging materials of the invention may be bonded not only to each other but also to any other heat sealable surface such as polypropylene laminated film, a polyethylene laminated film or a polybutene laminated film or sheet. Further, it may be utilized for the use of surface covering such as adhesive tape, sheet and protective film.

Practical and presently preferred embodiments of the invention are illustratively shown in the following Examples wherein part(s) and % are by weight unless otherwise indicated. In these Examples, the physical properties are determined as follows:

(1) Coefficient of Friction (A) Friction coefficient at room temperature

Determination is effected at 20° C. under a relative humidity of 65% according to ASTM D-1894.

(B) Friction coefficient at high temperature

On the surface of a hot plate heated at 120° C., an adhesive tape made of polyvinylidene fluoride is stuck, and a test film or sheet is contacted therewith. Under a vertical load of 4.5 g/cm$^2$, sliding is effected with a speed of 2 m/sec, and the friction coefficient is recorded.

(2) Heat Seal Strength

Heat sealing is effected by the aid of a thermal inclination heat sealer (manufactured by Toyo Seiki K.K.) under a pressure of 1 kg/cm$^2$ for 0.5 second, and the peeling-off strength is measured under a speed of 200 mm/min.

(3) Sealing

By the aid of an automatic packing machine, 100 sealings per minute are effected at 140° C., and the air-tightness of the sealed portion is judged from the amount of leaking water. Into an externally packed product in a box form, water containing 0.2% of a surface active agent (50 ml) is poured, and the amount of water leaking in 1 minute is measured. Evaluation is effected according to the following criteria:

| Class | Amount of leaking water (ml/min) |
|---|---|
| A | 0–10 |
| B | 11–20 |
| C | 21–30 |
| D | 31–50 |
| E | larger than 50 |

(4) Transparency and Haze

Determination is made by the aid of a haze tester (manufactured by Toyo Seiki K.K.) according to JIS-K6714.

(5) Gloss

Determination is made according to JIS-Z8714.

(6) Rate of Bad Packaging

After effecting the packaging at the heat seal temperature of 140° C. at the rate of 100 pcs/min, 200 packages were picked up at random from the obtained packages and the number of the defective articles such as defective folding, defective sealing, defective articles which could not be packaged in contact with the article to be packaged, etc., and the values obtained by dividing by 200 pcs. are expressed in percentages.

(7) Wrinkles at the heat-sealed part

Evaluation is made on the following criteria:
A: None
B: Slight but beautiful
C: Partial
D: Much
E: Over the whole surface (8) Degree of close-fitting packaging Evaluation is made on the following criteria:
A: Fully tight-packaged
B: Nearly tight-packaged
C: Slight spaces
D: Many spaces
E: Remarkable spaces (9) Automatic Supply By the use of an automatic packaging machine W-37 (manufactured by Tokyo Automatic Machinery Co., Ltd.), packaging is effected at a rate of 100 packages/min. The state of the continuous automatic supply of a film is observed for 1 minute, and evaluation is made on the following criteria:
o: No material problem; smooth supply
Δ: Occasional problems occur
x: Automatic supply is impossible due to winding-up of the film around the cutter and electrostatic adhesion of the film onto the guide surface

(10) Surface Wetting Tension

A test liquid consisting of dimethylformamide and ethyleneglycol monoethylether (manufactured by Wako Pure Chemicals Co., Ltd.) is applied onto the surface of a film. When the cohesion of the test liquid is going to start 2 seconds after the application, the wetting tension is measured and taken as the surface tension of the film.

The abbreviations used in the following Examples have the meanings as follows:

(P-1): Isotactic polypropylene; intrinsic viscosity, 2.0 dl/g (determined in tetraline at 135° C.).
(P-2): Propylene/ethylene copolymer; ethylene content, 4.5% by weight, melt index, 2.0 g/10 min.
(P-3): Propylene/butene-1 copolymer; butene-1 content, 15% by weight.
(P-4): Isotactic polypropylene; intrinsic viscosity, 2.1 dl/g.
(P-5): Polybutene-1; melt index, 2.0 g/10 min.
(P-6): Propylene/ethylene copolymer; ethylene content, 3.5% by weight; melt index, 6.0 g/10 min.
(P-7): Ethylene/vinyl acetate copolymer; vinyl acetate content, 30% by weight; melt index, 7.0 g/10 min.
(P-8): Propylene/ethylene copolymer; ethylene content, 4.0% by weight; melt index, 2.5 g/10 min.
(P-9): Propylene/butene-1 copolymer; butene-1 content, 20% by weight.
(P-10): Isotactic polypropylene; melt index, 4.5 g/10 min.
(P-11): Propylene/ethylene copolymer; ethylene content, 5.0% by weight.
(P-12): Butene/propylene copolymer; propylene content, 10%.
(P-13): Isotactic polypropylene; intrinsic viscosity, 1.8 dl/g.
(P-14): Propylene/ethylene copolymer; ethylene content, 4.5% by weight; melt index, 4.0 g/10 min.
(L-1): Petroleum resin (tradename "ALCON P-115" manufactured by Arakawa Rinsan Co., Ltd.).
(L-2): Polyethylene wax; molecular weight, 2000.
(L-3): Rosin ester.
(L-4): Terpene phenol resin (tradename "YS POLYSTAR" manufactured by Yasuhara Yushi Co., Ltd.).
(A-1): Stearic acid monoglyceride.
(A-2): Alkylamine-ethylene oxide adduct (tradename "DENON 331" manufactured by Marubishi Yuka Co., Ltd.).
(A-3): Castor Oil-ethylene oxide adduct.
(A-4): Hydroxystearoamide (tradename "DIAMID KH" manufactured by Nihon Kasei Co., Ltd.).
(A-5): Polyoxyethylene monostearate stearylamine.
(A-6): Erucic acid amide.
(S-1): Polypropylene glycol-modified silicone; viscosity, 100 centistokes at 20° C.
(S-2): Polyolefine-modified silicone.
(S-3): Polyether-modified silicone.

EXAMPLE 1

Figure 1:
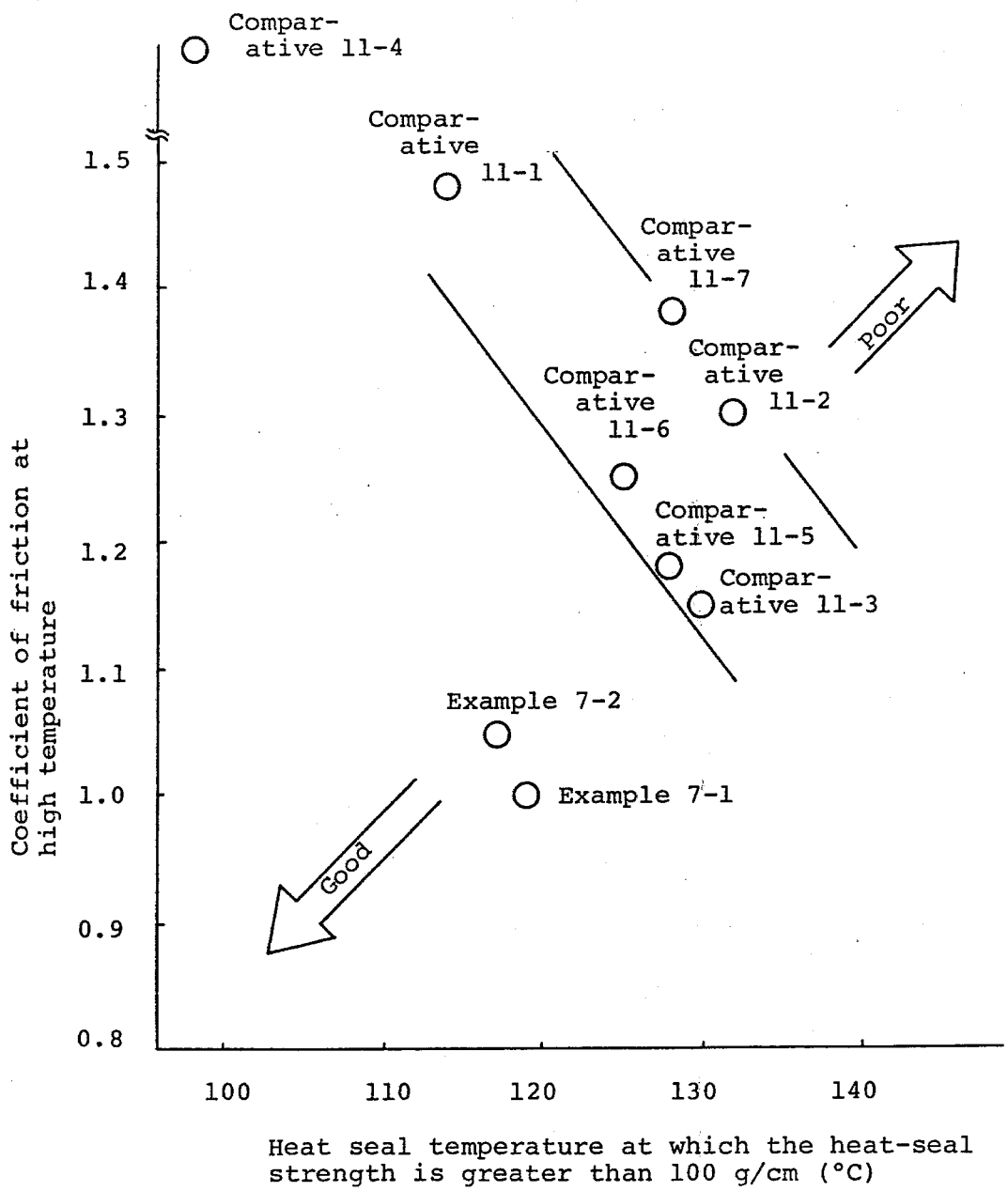
FIGS. 1–8 show the properties of the packaging of the present invention.

As a base layer (A), there was used a composition comprising a mixture of 90 parts of (P-1) and 10 parts of (L-1) incorporated with 0.5 part of (A-1) and 1.0 part of (A-2).

As a surface layer (B), there was used a composition comprising a mixture of 40 parts of (P-2) and 60 parts of (P-3) incorporated with 0.04 part of (S-1), 0.02 part of (A-3), 0.1 part of (L-2), 0.3 part of (A-1) and 0.3 part of (A-4).

Said compositions of the layer (A) and the layer (B) were melt extruded on two extruders to obtain an unstretched composite film composed of the three layers (B)/(A)/(B) and having a thickness of 960 microns. The film was stretched at 130° C. 4.0 folds in a machine direction and 8.0 folds in a transverse direction, subjected to heat setting at 155° C. with a relaxation of 5% and then cooled under blowing of 20° C. air to obtain a biaxially stretched composite film having a thickness of 30 microns.

The composite film was slit to make a narrow breadth, and external package of square boxes of 70 mm in height, 55 mm in width and 20 mm in thickness was effected by the aid of an automatic packaging machine of sliding type at a temperature as shown in Table 1 under a speed of 100 boxes/min.

COMPARATIVE EXAMPLE 1

On each surface of a biaxially stretched polypropylene film comprising solely the composition for the base layer (A) in Example 1, a mixture comprising polyvinylidene chloride as the main component and a lubricating agent and an antistatic agent as the additives was applied to form a coating layer of 1.5 g/m$^2$ so as to obtain a both surface-heat-sealable packaging material. Using the thus obtained packaging material, package of square boxes was effected as in Example 1 by the aid of an automatic packaging machine.

COMPARATIVE EXAMPLE 2

A mixture of 90 parts of (P-1), 10 parts of (L-3) and 0.5 part of (A-1) was melt extruded to obtain an unstretched film having a thickness of 1200 microns. This film was stretched 5.0 folds in a machine direction at 140° C. and then 8 folds in a transverse direction at 150° C. to obtain a biaxially stretched film having a thickness of 30 microns, which was subjected to thermal setting at 160° C. for 10 seconds and then to corona discharge treatment to make a wet tension of 40 dyne/cm. Using the thus treated film, package of square boxes was effected as in Example 1 by the aid of an automatic packaging machine.

COMPARATIVE EXAMPLE 3

Using a poly-layer dies having three manifolds, an unstretched film composed of three layers, i.e. the base layer (A) and the surface layers (B) laid on both surfaces of the base layer (A), was prepared by melt-extruding as in Example 1. The base layer (A) comprised 100 parts of (P-4), 0.5 part of (A-1) and 1.0 part of (A-2), and the surface layers (B) comprised 100 parts of (P-3), 0.04 part of (S-1), 0.02 part of (A-3), 0.1 part of (L-2) and 0.3 part of (A-1). The thus obtained film having a thickness of 960 microns was stretched 4 folds in a machine direction at 129° C. and 8 folds in a transverse direction at 150° C. and then subjected to heat treatment to obtain a biaxially stretched film having a thickness of about 30 microns. The thickness of the surface layer was about 0.8 micron on one surface. Using the thus treated film, package of square boxes was effected as in Example 1 by the aid of an automatic packaging machine.

COMPARATIVE EXAMPLE 4

The preparation of a biaxially stretched composite film was effected in the same manner as in Comparative Example 3 except that (P-2) was employed in place of (P-3) as the polymer for the surface layer (A). Using the thus obtained film, package of square boxes was effected as in Example 1 by the aid of an automatic packaging machine.

COMPARATIVE EXAMPLE 5

The preparation of a biaxially stretched film was effected in the same manner as in Example 1 except that a composition comprising 50 parts of (P-1) and 50 parts of (P-5) was applied as the surface layer (B). Using the thus obtained film, package of square boxes was effected as in Example 1 by the aid of an automatic packaging machine.

COMPARATIVE EXAMPLE 6

The preparation of a biaxially stretched film was effected in the same manner as in Example 1 except that a composition comprising 50 parts of (P-6) and 50 parts of (P-5) was applied as the surface layer (B). Using the thus obtained film, package of square boxes was effected as in Example 1 by the aid of an automatic packaging machine.

COMPARATIVE EXAMPLE 7

In the same manner as in Example 1, an unstretched sheet made by laminating the surface layers (B) comprising 100 parts (of (P-7), 0.3 part of (A-1), 0.02 part of (A-3) and 0.04 part of (S-1) on both surfaces of the base layer (A) according to Example 1 was stretched. However, the sheet adhered to the longitudinal stretching roll and coiled thereon, and the surface layer stuck to the surface of the metal roll to cause peeling, and no laminated film could be produced at all. Therefore, the temperature of the longitudinal stretching roll was lowered to 60° C., and stretching was effected 4.0 folds, followed by 8.0 folds transverse stretching at 155° C., whereupon it was found that the surface layer resin adhered to the clip to deteriorate the clip holding force, scattering of resin was caused, and the breaking strength during transverse stretching was extremely poor. The results were evaluated with the small quantity of films which could be produced with difficulty.

TABLE 1

| Properties | Example 1 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Transparancey (%) | 95 | 93 | 95 | 94 | C. | 88 | 88 | 81 |
| Gloss (%) | 135 | 108 | 112 | 85 | 92 | 75 | 77 | 41 |
| Haze value (%) | 2.0 | C. | 1.8 | 8.0 | 2.8 | 12 | 11.0 | 15 |
| Friction coefficient Between films | 0.35 | 0.39 | 0.45 | 0.78 | 0.68 | 0.65 | 0.75 | 1.21 |
| Between films and metal | 0.16 | 0.22 | 0.27 | 0.25 | 0.23 | 0.23 | 0.29 | 0.16 |
| Friction coefficient at high temperature | 0.80 | 0.82 | 0.78 | 1.6 | 1.25 | 1.40 | 1.28 | measurement impossible |
| Automatic suppliability | o | o | x | x | x | x | Δ | x |
| Wrinkles at heat-sealed portion | | | | | | | | |
| 120° C. | A | A | A | B | B | A | A | E |
| 135° C. | A | A | A | C | B | B | C | E |
| 150° C. | A | A | A | C | C | C | C | E |
| 165° C. | A | B | B | D | C | E | E | E |
| Grade of seal packaging | | | | | | | | |
| 120° C. | C | E | E | D | E | C | C | C |
| 135° C. | A | D | E | C | E | B | B | E |
| 150° C. | A | C | E | B | D | A | B | E |
| 165° C. | A | C | E | C | C | C | B | E |
| Heat-seal strength (g/cm) | | | | | | | | |
| 120° C. | 32 | 42 | 62 | 0 | 21 | 15 | 160 | |
| 135° C. | 120 | 41 | 63 | 195 | 16 | 38 | 40 | 180 |
| 150° C. | 66 | 80 | 220 | 175 | 65 | 160 | 180 | — |
| 165° C. | 220 | 83 | 85 | 270 | 272 | 80 | 200 | 200 |
| Degrees of close fitting | | | | | | | | |

TABLE 1-continued

| Properties | Film | | | | | | | |
|---|---|---|---|---|---|---|---|---|
| | Example 1 | Comparative Example 1 | Comparative Example 2 | Comparative Example 3 | Comparative Example 4 | Comparative Example 5 | Comparative Example 6 | Comparative Example 7 |
| packaging | | | | | | | | |
| 120° C. | A | A | A | B | A | B | B | E |
| 135° C. | A | A | A | C | A | B | B | E |
| 150° C. | A | A | A | D | B | C | C | E |
| 165° C. | A | A | A | D | C | D | D | E |
| Bad packaging rate (%) | | | | | | | | |
| 120° C. | 0.1 | 0.1 | automatic | 76 | 100 | 75 | 70 | 100 |
| 135° C. | 0.1 | 0.1 | suppli- | 100 | 90 | 100 | 100 | 100 |
| 150° C. | 0.1 | 0.2 | ability | 100 | 92 | 100 | 100 | 100 |
| 165° C. | 0.2 | 0.4 | being bad; no evaluation made | 100 | 100 | 100 | 100 | 100 |
| Intrinsic resistance of surface ($\Omega \cdot cm$) | $10^{10}$ | $10^9$ | more than $10^{16}$ | more than $10^{16}$ | more than $10^{16}$ | more than $10^{16}$ | more than $10^{14}$ | $10^{11}$ |
| Appearance of package | good | good | good, but readily broken | bad, a lot of wrinkles at sealed portion, tight packaging impossible | bad, a lot of wrinkles at sealed portion | insufficient in transparency, no commercial value | insufficient in transparency, no commercial value | bad, a lot of wrinkles, packaging impossible, no commercial value |

As understood from the above results, the package of the invention has excellent sealability without production wrinkles.

For attaining a high sealing degree, a large heat-seal strength is desirable, but more important are to satisfy the following conditions: absence of wrinkles at the sealed portion; absence of the state of bad tucking; that the surface softened by the hot plate melts in a flat state and slides under adhesion without causing peeling-off of the sealed portion; that a high lubricity is shown at heating without producing wrinkles and the state of bad tucking; and that the sealed portion must be bonded.

The results show that the high heat-seal strength is of course desirable, but that, to obtain a sealed package, the film free from wrinkles, bad tucking and pinholes by fusing of film is more important.

The film obtained in Comparative Example 1 is excellent in workability at package and in appearance, but the degree of close-fitting packaging is extremely low. The use of this film is therefore limited to package of products having a light weight and not requiring moisture-and insect-preventing conditions.

The film obtained in Comparative Example 2 is insufficient in automatic suppliability and can not be used in a packaging machine. By package under manual supply of this film, the sealed portion is excellent in gloss and appearance, wrinkles being hardly produced. But, the heat-seal strength is small and the seal-packaging degree is extremely low, so that kinds of products to be packed are limited to a narrow range, as in Comparative Example 1.

The film obtained in Comparative Example 3 has a high heat-seal strength, but the lubricity at high temperature is extremely low to produce a lot of wrinkles. In addition, close-fitting to the product to be packaged is insufficient to afford a loosely packed state. The grade of seal-packaging is also inferior because of wrinkles and peeling-off of the sealed portion due to the adhesion of the sealed part. Thus, practical use of this film is impossible.

In the film obtained in Comparative Example 4, the amount of wrinkles are somewhat decreased, but the heat-sealing ability at low temperature is insufficient. At low temperature at which wrinkles are hardly produced, the seal strength is small, and a sealed package is not obtained. At the heat-seal temperature higher than 150° C. at which the seal strength is improved, a lot of wrinkles are produced and the appearance is inferior, so that a sealed package can not be obtained. Thus, the degree of bad package is extremely large as in Comparative Examples 2 and 3.

In the film obtained in Comparative Example 5, the miscibility of polypropylene with polybutene-1 is small, and the transparency and the heat-seal strength are deteriorated. The lubricity at high temperature is also insufficient, so that a sealed package can not be obtained, and the degree of bad package is large. Thus, the film can not be employed in practical use.

The results of Comparative Example 6 are similar to those of Comparative Example 5, with only a slight improvement to transparency.

The film obtained in Comparative Example 7 has extremely inferior transparency and gloss due mainly to the surface damages caused by adhesion to the longitudinal stretching roll and scratch and to the hollows inside the film caused by the stretching at low temperature only. Moreover, the film has friction coefficient at higher temperature, many wrinkles at the heat-sealed portion and high friction coefficient at room temperature. It is apt to show stick-slip and has poor automatic suppliability. Though it may be excellent in sealability at high temperature, it is not applicable to automatic packaging machine. Though it may be applicable to heat-sealing under still conditions, it shows the same results as the case of insufficient heat sealing with an automatic packaging machine. In this process only the packaging materials having inferior degree of close-fitting packaging are obtainable.

For the purpose of giving an automatic suppliability with an automatic packaging machine to the films of Comparative Examples 2 to 7, (A-2) is incorporated into the composition of the surface layer (B) in an amount of 0.8% to the total weight of the composition in the preparation of each film, and the properties of the thus obtained films are determined. The results (only those in which notable changes are observed in comparison with the results of Table 1) are shown in Table 2.

TABLE 2

| Properties | | Comparative Example 2 | Comparative Example 3 | Comparative Example 4 | Comparative Example 5 | Comparative Example 6 | Comparative Example 7 |
|---|---|---|---|---|---|---|---|
| Friction coefficient | Between films | 0.37 | 0.60 | 0.49 | 0.48 | 0.52 | 1.20 |
| | Between film and metal | 0.19 | 0.22 | 0.20 | 0.21 | 0.23 | 0.27 |
| Friction coefficient at high temperature | | 0.74 | 1.43 | 1.15 | 1.31 | 1.29 | measurement impossible |
| Automatic suppliability | | Δ-x | Δ | Δ | Δ | Δ-o | x |
| Wrinkles at heat-sealed portion (150° C.) | | A | B-C | B | B | B | E |
| Grade of seal packaging (150° C.) | | E | C | E | C | C | E |
| Heat-seal strength (150° C.) (g/cm) | | 5 | 62 | 15 | 23 | 55 | 170 |
| Degree of close fitting packaging (150° C.) | | D | C | A | A | A | E |
| Bad packaging rate (150° C.) (%) | | 100 | 62 | 100 | 50 | 25 | 100 |
| Intrinsic resistance of surface (Ω . cm) | | $10^{14}$ | $10^{13.2}$ | $10^{13}$ | $10^{13.5}$ | $10^{12.0}$ | $10^{10}$ |
| Appearance of package | | unknown because of incomplete package | wrinkles remained, sealing degree low | appearance improved but sealed portion uneven (bad sealing) | a lot of wrinkles present at sealed portion, no transparency, inutile for practical use | a lot of flaws present at sealed portion, insufficient gloss, no transparency, inutile for practical use | bad, a lot of wrinkles present at sealed portion, packaging impossible, no commercial value | prepared in the same manner as in Example 1. The results are shown in Table 3.

TABLE 3

| Properties | Proportion of P-8/P-9 | | | | |
|---|---|---|---|---|---|
| | 100/0 | 94/6 | 50/50 | 20/80 | 0/100 |
| Friction coefficient at high temperature | 0.90 | 0.91 | 0.93 | 0.95 | 1.05 |
| Automatic suppliability | o | o | o | o | o |
| Wrinkles at heat-sealed portion (150° C.) | A | A | A | A-B | C |
| Grade of seal packaging (150° C.) | E | C | A | A | C |
| Heat-seal strength (110° C.) (g/cm) | 0 | 20 | 80 | 45 | 20 |
| Degree of close fitting packaging (150° C.) | E | A | A | A | B |
| Bad packaging rate (150° C.) (%) | 100 | 1.0 | 0.2 | 0.9 | 5.3 |
| Intrinsic resistance of surface (Ω . cm) | $10^{10}$ | $10^9$ | $10^9$ | $10^9$ | $10^9$ |
| Appearance of package | packaging impossible | good | good | good | packaging almost made but a lot of wrinkles present at sealed portion |

EXAMPLE 2

As the base layer (A), the same composition as in Example 1 was employed. As the surface layer (B), the polymers (P-8) and (P-9) were admixed in varied mixing proportions to obtain a polymer mixture. To 100 parts of the resultant polymer mixture, 0.05 part of (S-2), 0.5 part of (A-1), 0.3 part of (A-4) and 0.2 part of (L-2) were added. Using these compositions, a composite film were prepared in the same manner as in Example 1. The results are shown in Table 3.

EXAMPLE 3

Packaging tests were effected with the films as in Example 2 [(P-8)/(P-9)=50/50] but changing the thickness of the surface layer, the whole thickness of the composite film being 30 microns. The packaging type was cigarette hold type. The results are shown in Table 4.

TABLE 4

| Properties | Thickness of surface layer (μ) | | | | |
|---|---|---|---|---|---|
| | 0.4 | 0.6 | 1.0 | 2.0 | 28 |
| Friction coefficient at | 0.53 | 0.71 | 0.88 | 1.25 | due to stick- |

TABLE 4-continued

| Properties | Thickness of surface layer ($\mu$) | | | | |
|---|---|---|---|---|---|
| | 0.4 | 0.6 | 1.0 | 2.0 | 28 |
| high temperature | | | | | slip, measurement impossible |
| Automatic suppliability | o | o | o | o | x |
| Wrinkles at heat-sealed portion (150° C.) | A | A | A | B | E |
| Grade of seal packaging (150° C.) | C | A | A | B | E |
| Heat-seal strength (110° C.) (g/cm) | 18 | 58 | 65 | 90 | 170 |
| Degree of close fitting packaging (150° C.) | A | A | A | A | E |
| Bad packaging rate (150° C.) (%) | 0.6 | 0.12 | 0.10 | 0.3 | 85 |
| Intrinsic resistance of surface ($\Omega \cdot$ cm) | $10^{11.2}$ | $10^{10.2}$ | $10^{9.3}$ | $10^{9.2}$ | $10^{9.0}$ |
| Appearance of package | good | good | good | rather good but few scratches present at sealed portion | extremely bad, a lot of wrinkles present at sealed portion, sealing and close fitting not good |

EXAMPLE 4

Preparation of a composite film was effected using the same composition for the surface layer (B) as in Example 1 but with a varied amount of (L-1) to be mixed in the base layer (A) of Example 1, on which examinations were specially made on automatic suppliability, grade of seal packaging, close fitting packaging and degree of bad packaging due to bad form of the tucked portion by the automatic packaging machine. The results are shown in Table 5.

TABLE 5

| Properties | L-1 (%) | | | | | |
|---|---|---|---|---|---|---|
| | 0 | 2 | 10 | 20 | 30 | 50 |
| Automatic suppliability | o - Δ | o | o | o | Δ | x |
| Grade of seal packaging (150° C.) | A | A | A | A | C | C |
| Degree of close fitting packaging (150° C.) | B | A | A | A | B | C |
| Bad packaging rate (150° C.) (%) | 2.0 | 0.2 | 0.1 | 0.1 | 15.5 | 25 |
| Intrinsic resistance of surface ($\Omega \cdot$ cm) | $10^{12.8}$ | $10^{10.3}$ | $10^{10.3}$ | $10^{9.8}$ | $10^{10.2}$ | $10^{10.2}$ |

When the amount of (L-1) is 0%, the automatic suppliability is decreased because antistatic property is somewhat reduced and the film is adsorbed to the guide plate or winds round the automatic cutter. When the content of (L-1) is high, heat generation is caused at the automatic cutter by the cutting of the film in case of operation for a long time, and the resin softened by heat accumulates to the cutting edge to cause insufficient cutting or pollution of the cut portion. As to the grade of seal-packaging, thermal contraction of the film is apt to occur when the content of (L-) is high, and the extent of cooling of the sealed portion is varied in each part, so that the film is not solidified in a flat form. Therefore, the heat-sealed portion becomes uneven, and the sealing degree is reduced because of the presence of gaps due to the unevenness.

The degee of close-fitting packaging indicates whether the product to be packaged is tightly packaged. By incorporating 2 to 20% of (L-1), an adequate power of thermal contraction is produced at the heat sealed portion to obtain a beautiful heat sealed surface. In the heat sealed surface and its environs, a temperature gradient is formed under heating and becomes more notable in a remoter part from the seal surface, so that an adequate momentary contraction gives a good tension. When the content of (L-1) becomes larger, wave-like slackening of the film is caused from the sealed portion, and tight packaging is not attained.

A bad package is somtimes caused by insufficient quiding of the film due to static electricity. This is observed particularly when (L-1) is not added. In case of (L-1) content being high, the bendability is improved, but insufficiency of lubricity, probably due to some bleeding-out by the stretching and thermal setting, and deformation of the film due to thermal contraction becomes notable to produce bad appearance and to cause unevenness of the sealed portion, so that commercial value is reduced.

EXAMPLE 5

To 100 parts of a polymer mixture comprising 90% of (P-1) and 10% of (L-3), 1.0 part of (A-5) was added to make a composition for the base layer (A). On the other hand, to 100 parts of a mixed resin of (P-11) and (P-9) in a weight ratio of 1:1, 0.01 parts of (S-3) and 0.1 part of (A-6) were incorporated to make a composition for the layer (B). These compositions were co-extruded, the layer (B) being piled on one surface of the layer (A), and the extruded product was stretched 4.5 folds in a machine direction at 130° C. and 8.5 folds in a transverse direction at 158° C.

The resultant film was a biaxially stretched composite film composed of the two layers (A)/(B) and having a thickness of 20 microns. This film was heat-set at 160° C. and subjected to corona discharge treatment on the surface of the layer (A) to obtain a wet tention of 42 dyne/cm.

Using the thus obtained composite film, package of slit-form dried laver was effected by the aid of an automatic packaging machine to examine the sealability. The results are shown in Table 6.

EXAMPLE 6

Using the same composition as the composition of the layer (A) in Example 5, an unstretched film was produced, which was stretched 4.5 folds in a machine direction at 135° C. The composition of the surface layer stretched under the same procedure as in Comparative Example 8.

TABLE 6

| Properties | Film | | | | |
|---|---|---|---|---|---|
| | Example 5 | Example 6 | Comparative Example 8 | Comparative Example 9 | Comparative Example 10 |
| Haze value (%) | 2.9 | 3.1 | 2.8 | 2.7 | 4.0 |
| Transparency (%) | 95 | 94 | 92 | 96 | 90 |
| Gloss (%) | 135 | 131 | 126 | 136 | 103 |
| Wrinkles at heat sealed portion | | | | | |
| 120° C. | A | A | A | B | A |
| 135° C. | A | A | A | B | A |
| 150° C. | A | A | A | A | B |
| 165° C. | B | B | A | A | C |
| Heat-seal strength (g/cm) | | | | | |
| 120° C. | 65 | 80 | 2 | not sealed | 20 |
| 135° C. | 150 | 170 | 15 | not sealed | 44 |
| 150° C. | 210 | 230 | 110 | 35 | 112 |
| 165° C. | 280 | 280 | 360 | 370 | 160 |
| Grade of seal packaging | | | | | |
| 120° C. | A | A | E | E | C |
| 135° C. | A | A | E | E | C |
| 150° C. | A | B | C | E | B |
| 165° C. | A | B | A | D | B |
| Automatic suppliability | o | o | o | o | o |

(B) of Example 5 was melt-extruded to laminate on the surface layer of the above uniaxially stretched film to make a composite film, which was stretched in a transverse direction 8.5 folds at 150° C. The resulting film comprised the two layers of (A) and (B) with biaxial stretching on one surface and uniaxial stretching on the other side, and had a thickness of 20 microns. The film was treated in the same manner as in Example 5, and subjected to the packaging test under the same conditions as in Example 5. The results are shown in Table 6.

For comparison, the films obtained in the following Comparative Examples are subjected to the same sealability test. The results are also shown in Table 6.

COMPARATIVE EXAMPLE 8

The composition for the base layer (A) was the same as in Example 5. After stretching the base layer (A) in a machine direction, on which the surface layer (B) comprising as the polymer (P-11) only and as others the same compositions was laminated. The laminated film was transversely stretched and heat-set in the same manner as in Example 5, and corona discharge treatment was given to the base layer (A) side.

COMPARATIVE EXAMPLE 9

Using the same polymer compositions as those of Comparative Example 8 for both the base layer (A) and the surface layer (B), a biaxially stretched film was obtained in the same manner as in Example 5.

COMPARATIVE EXAMPLE 10

The base layer (A) having the same composition as in Example 5 was stretched in a machine direction, on one surface of which the surface layer (B) comprising as the polymer (P-12) only and as others the same composition as in Example 5 was laminated. The resulting film was When the resultant package is allowed to stand at 40° C. in a relative humidity of 80% for one month, the laver is moistened in case of the seal-packaging degree being low and adheres to the inside of the packaging material to cause a phenomenon of wetting, whereby black spots are seen in the film, and the taste of the laver is deteriorated to reduce the commercial value. In this test, the best results are obtained with the film of Example 5. With the film of Comparative Example 8, package at 120° to 135° C. affords bad results, and a sealed package can be obtained only at a high temperature.

The films of Comparative Example 9 show extremely poor sealability at low temperature. The film having the surface layer (B) consisting only of (P-11) copolymer shows further inferior results to Comparative Example 8, in consequence of the biaxial stretching. When it is used for packaging at a low temperature side, fixing of seal portion can not be made due to the poor heat seal property, so that the package forms wrinkles. Naturally, this film shows extremely poor seal packaging.

The film of Comparative Example 10 has a range to afford sealed packages. But, the appropriate conditions are limited to a narrow range, and heat-sealing at high temperature is necessitated. Further, the haze value is insufficient, and the apparent color of the laver comes to be changed, only the sealed portion being transparent. Thus, the package obtained has a deteriorated commercial value.

EXAMPLE 7 AND COMPARATIVE EXAMPLE 11

The base layer (A) and the surface layer (B) were constituted with the polymers as shown in Table 7. In the test, the conditions of extrusion, film-making and stretching in Examples 7-1, 7-2, 11-1, 11-2, 11-3, 11-4, 11-5, 11-6 and 11-7 were set respectively as in Examples 1, 6, Comparative Examples 3, 4, 5, 7, 6, 6 and 8.

TABLE 7

| | | Example | | Comparative Example | | | | | | |
|---|---|---|---|---|---|---|---|---|---|---|
| | | 7-1 | 7-2 | 11-1 | 11-2 | 11-3 | 11-4 | 11-5 | 11-6 | 11-7 |
| Component | Base layer (A) | P-1 | P-1 | P-1 | P-1 | P-1 | P-1 | P-1 | P-1 | P-1 |
| | Surface | P-2/P-9 | P-2/P-9 | P-9 | P-2 | P-1/P-5 | P-7 | P-2/P-5 | P-5 | P-2 |

TABLE 7-continued

|  |  | Example | | Comparative Example | | | | | | |
|---|---|---|---|---|---|---|---|---|---|---|
|  |  | 7-1 | 7-2 | 11-1 | 11-2 | 11-3 | 11-4 | 11-5 | 11-6 | 11-7 |
|  | layer (B) (%) | (40/60) | (40/60) | (100) | (100) | (40/60) | (100) | (40/60) | (100) | (100) |
| Properties | Heat-seal temp. (*) | 119 | 117 | 114 | 132 | 130 | 98 | 128 | 125 | 128 |
|  | Friction coefficient at high temperature | 1.00 | 1.05 | 1.48 | 1.30 | 1.15 | but to stick-slip, measurement impossible | 1.18 | 1.25 | 1.38 |
|  | Orientation of surface layer | biaxial | uniaxial | biaxial | biaxial | biaxial | biaxial | biaxial | biaxial | uniaxial |
|  | Haze (%) | 1.3 | 1.5 | 4.5 | 2.3 | 11.2 | 13.8 | 10.7 | 15.3 | 1.8 |
|  | Gloss (%) | 139 | 135 | 103 | 117 | 78 | 48 | 81 | 45 | 132 |

Note:
(*) The temperature at which the heat-seal strength was greater than 100 g/cm.

The relationship between "heat-seal temperature at which the heat-seal strength is greater than 100 g/cm" and "friction coefficient at high temperature" is shown in the accompanying FIG. 1, from which the following characteristics are observed:

(1) Relationship Between the Heat Sealability at Low Temperature and Friction Coefficient at High Temperature The material which is heat sealable at low temperature means that it is susceptible to softening and melting at a temperature near the temperature at which is is heat-sealed. Accordingly, it is apparent from the category on cohesion that generally the friction coefficient of the film becomes high in the range of the temperature near the temperature at which the heat-sealing is being effected.

However, as the automatic packaging materials, as explained in the preceding paragraphs, the friction coefficient at high temperature has a remarkable effect upon formation of wrinkles at the heat-sealed portion so that the low friction coefficient at high temperature is strongly demanded.

On the other hand, in the automatic packaging which requires operation at high speed and perfect heat-sealing, the heat-sealability at low temperature is the essential factor.

In FIG. 1, a direction (⇒ Good) is represented, denoting that the polymer composition of the invention is in extremely good position. The comparison between Example 7-1 comprising the copolymers only and Example 7-2 shows that the blend and the copolymer have different chemical compositions and are different in thermal behaviors in respect to friction.

(2) Haze Value and Gloss

Comparative Examples 11-3 and 11-5 and 11-6 are in fairly good regions; but they are inferior in friction coefficient at high temperature, haze and gloss and are remarkably poor in appearance characteristics as the packaging materials. These are the optical behaviors produced from the factors of compatability between the blend polymers and cyrstallinity.

(3) Results

The evaluations made on the films comprising only the polymers from which the additives are excluded are to clarity that the friction coefficient at high temperature, the haze and the gloss are determined by the essential properties of the polymer. Though the heat seal property is apt to be deteriorated by the additive, selection of the polymer which essentially has a good sealability is the basic requirement.

As observed, the characteristics which form the key points in automatic packaging are good appearance characteristics, low friction coefficient at high temperature (small adhesion or wrinkles) and applicability of thermal bonding at low temperature.

EXAMPLE 8

Figure 2:
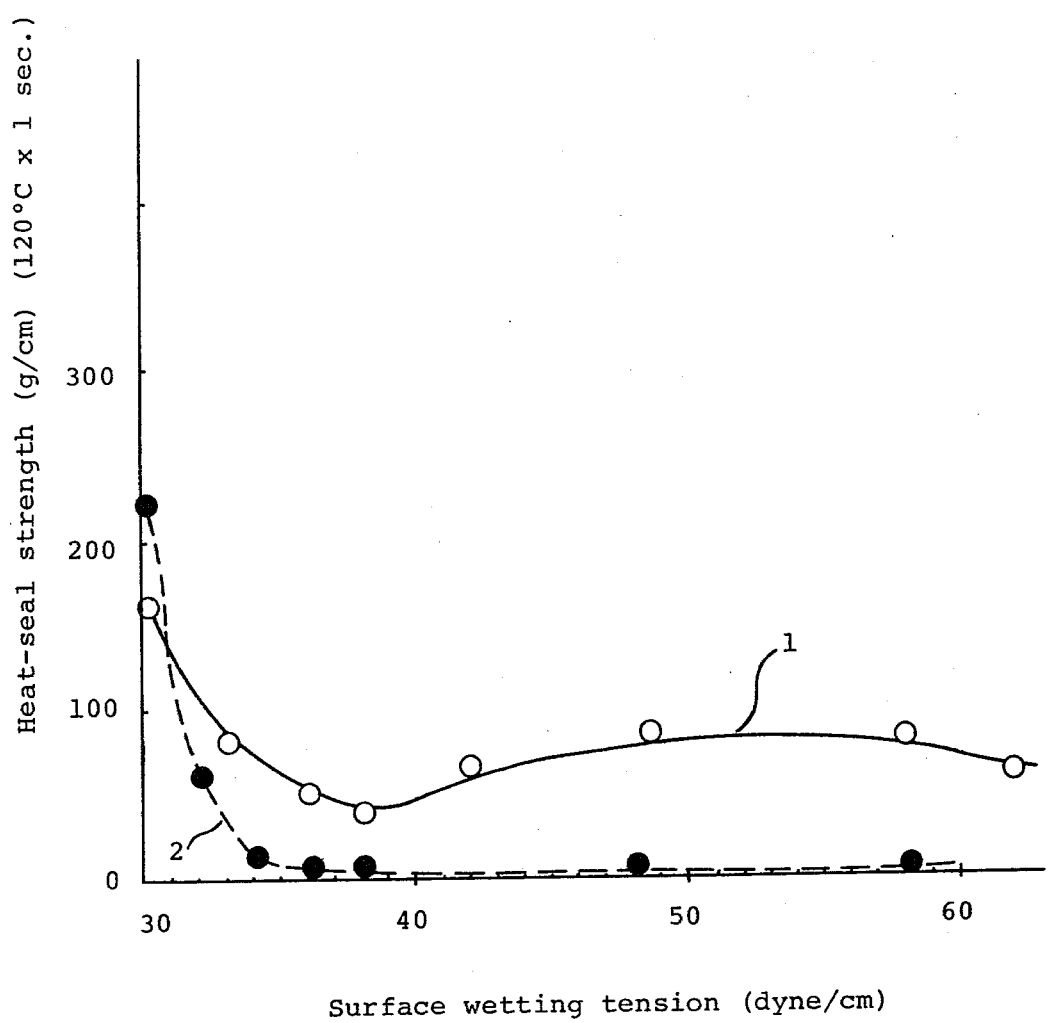

As the base layer (A), 0.3 part of (A-1) was added to 100 parts of (P-13). As the surface layer (B), 10 parts of (L-4) were added to 100 parts of a mixture of 30 parts of (P-14) and 70 parts of (P-9). Under the same conditions as in Example 1, these compositions were subjected to extrusion, film-making, stretching and heat setting, followed by corona discharge treatment. As shown in the accompanying FIG. 2, with various modifications of the corona discharge treatment degrees, the heat-seal properties of the film were evaluated (i.e Curve 1). The results indicate that the heat-seal strength showed little loss. For comparison, the film of Comparative Example 11-1 was oriented, heat-set and provided with corona discharge treatment, the result of which was shown as Curve 2 in FIG. 2. Usually, the film showed lowering of heat-seal property when subjected to corona discharge treatment. The gloss of the film was 139% in Comparative Example 11-1 not incorporated with (L-4) but 145% in Example 8.

EXAMPLE 9

Figure 3:
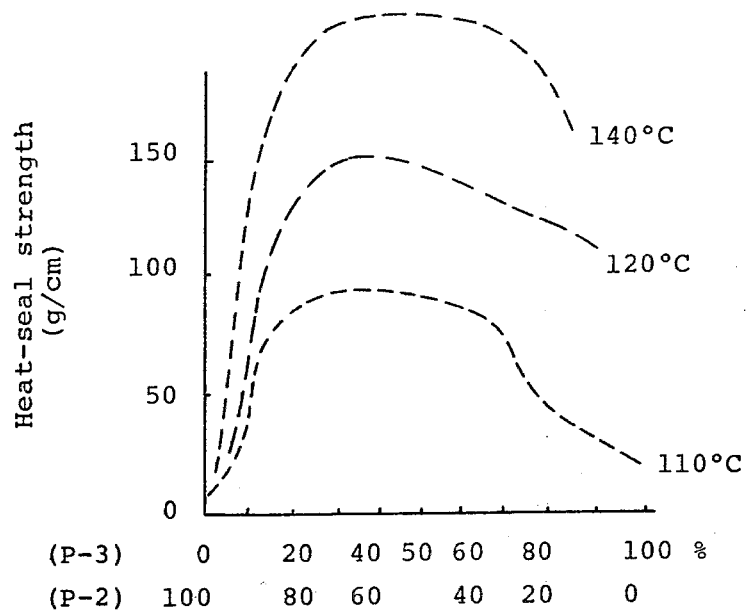

Excepting that the compositions for constituting the base layer (A) and the surface layer (B) in Example 1 were limited to polymers, i.e. (P-1) and (P-2)+(P-3) only, and the mixing proportions between (P-2) and (P-3) were varied, the films were prepared under the same conditions as in Example 1. The relationship between (P-2)/(P-3) mixing ratios of the films and the heat seal strengths at 110° C., 120° C. and 140° C. are shown in the accompanying FIG. 3.

COMPARATIVE EXAMPLE 12

Figure 4:
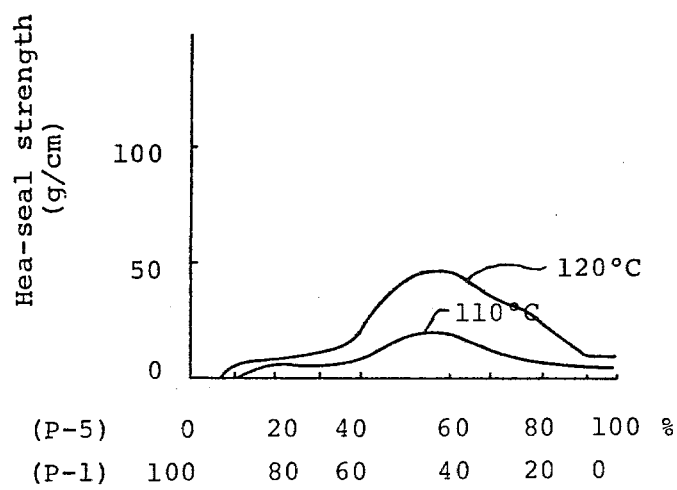

Excepting that the compositions for constituting the base layer (A) and the surface layer (B) were limited to polymers, i.e. (P-1) and (P-1)+(P-5) only, and the mixing proportions for the surface layer, i.e. (P-1) and (P-5), were changed, the films were prepared under the same conditions as in Comparative Example 5. The relationships between the respective mixing ratios of the films and the heat-seal strengths are shown in the accompanying FIG. 4.

EXAMPLE 10

Figure 5:
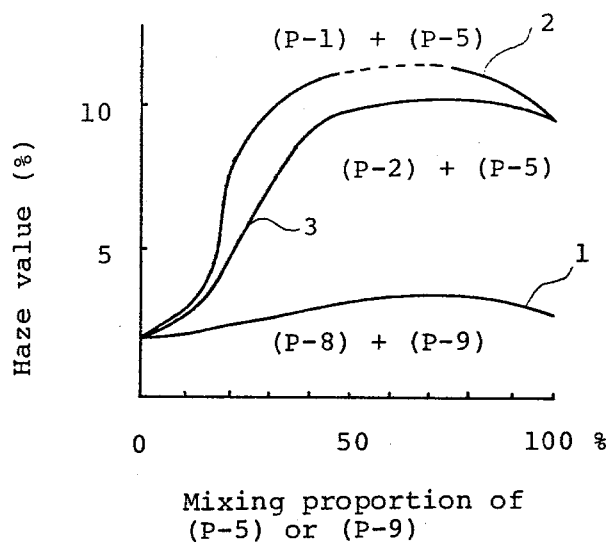

Excepting that the mixing proportions between (P-8) and (P-9) in Example 2 were varied, the films were obtained under the same conditions as in Example 2. The relationships between the mixing ratios and the haze values of the films are shown as Curve 1 in the accompanying FIG. 5.

Besides, excepting that the polymers used were (P-1) and (P-5) and the mixing proportions between (P-1) and (P-5) were varied, the films were prepared in the same manner as in Example 2. The relationships between the mixing ratios and the haze values of the films are shown as Curve 2 in FIG. 5.

Further, excepting that the polymers used were (P-2) and (P-5) and the mixing proportions between (P-2) and (P-5) were varied, the films were prepared in the same manner as in Example 2. The relationships between the mixing ratios and the haze values of the films are shown as Curve 3 in FIG. 5.

EXAMPLE 11

Figure 6:
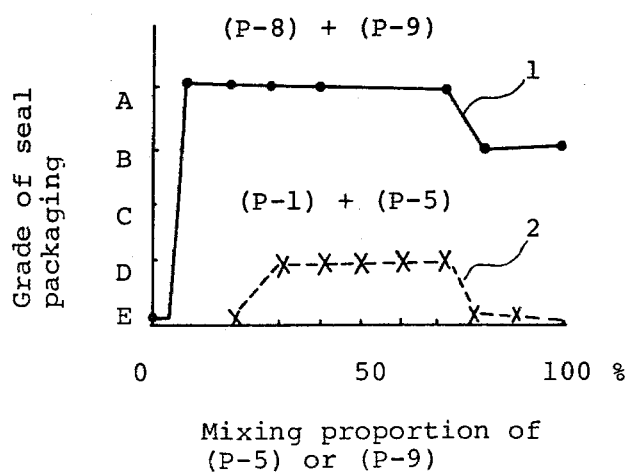
Figure 7:
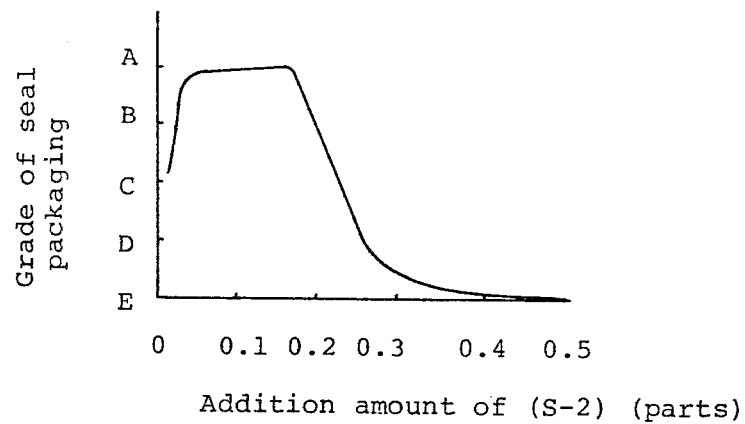

Excepting that the mixing proportions between (P-8) and (P-9) were varied, the films were prepared in the same manner as in Example 2. The relationships between the mixing ratios and the grade of seal packaging are shown as Curve 1 in the accompanying FIG. 6.

Further, excepting that the polymers used were limited to (P-1) and (P-5) and the mixing proportions between (P-1) and (P-5) were varied, the films were prepared in the same manner as in Example 2. The relationships similar to the above are shown as Curve 2 in FIG. 6.

EXAMPLE 12

Figure 8:
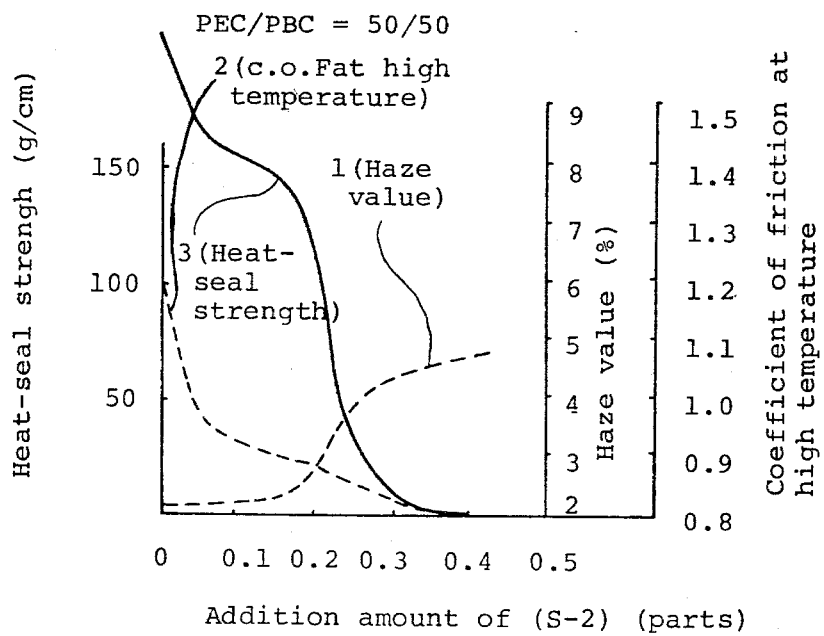

With the mixing proportion between (P-8) and (P-9) set to 50/50 and mixing amounts of (S-2) were varied, the films were prepared in the same manner as in Example 2. The relationships between the mixing amounts of (S-2) and the grade of seal packaging were inspected, and the results are shown as Curve 1 in the accompanying FIG. 8. Also, their relationships with the friction coefficient at high temperature were inspected. The results are shown as Curve 2 in FIG. 8. Further, their relationships with the heat-seal strengths were also inspected. The results are shown as Curve 3 in FIG. 8.

What is claimed is:

1. A heat sealable material comprising (A) a stretched base layer comprising a propylene polymer and (B) on at least one surface of said base layer a stretched surface layer comprising a blend of a propylene-ethylene copolymer and a $C_4$–$C_{10}$ α-olefin-propylene copolymer comprising units of $C_4$–$C_{10}$ α-olefin and units of propylene in a weight proportion of 30:70 to 5:95, said blend being present in a weight proportion of 20:80 to 94:6 by weight.

2. The packaging material according to claim 1, wherein the propylene-ethylene copolymer comprises units of propylene and units of ethylene in a weight proportion of 99.5:0.5 to 90:10.

3. The packaging material according to any of claims 1 or 2, wherein the base layer (A) comprises further a low molecular weight thermoplastic resin in an amount of 80 to 98 parts by weight to 100 parts by weight of the combined amount of the propylene polymer and the low molecular weight thermoplastic resin.

4. The packaging material according to claim 3, wherein the low molecular weight thermoplastic resin is the one selected from the group consisting of hydrocarbon resins, rosins, dammars and phenol resins, and their derivatives and modified substances.

5. The packaging material according to any of claims 1 or 2, wherein the base layer (A) comprises further at least one of an antistatic agent, a lubricant and an anti-blocking agent.

6. The packaging material according to claim 5, wherein at least one of the surface layers (B) comprises further at least one of an antistatic agent, a lubricant and an anti-blocking agent.

7. The packaging material according to claim 6, wherein at least one of the surfaces is subjected to electric discharge treatment and has a wetting tension of 30.5 to 58 dyne/cm.

8. The packaging material according to claim 6, wherein the antistatic agent is incorporated in an amount of 0.5 to 3 parts by weight and a lubricant and an anti-blocking agent in a combined amount of 0.1 to 3 parts by weight to 100 parts by weight of the propylene polymer.

9. The packaging material according to claim 5, wherein at least one of the surfaces is subjected to electric discharge treatment and has a wetting tension of 30.5 to 58 dyne/cm.

10. The packaging material according to claim 5, wherein the antistatic agent is incorporated in an amount of 0.5 to 3 parts by weight and a lubricant and an anti-blocking agent in a combined amount of 0.1 to 3 parts by weight to 100 parts by weight of the propylene polymer.

11. The packaging material according to any of claims 1 or 2, wherein at least one of the surface layers (B) comprises further a silicon oil in an amount of 0.01 to 0.15 part by weight to 100 parts by weight of the blend.

12. The packaging material according to any of claims 1 or 2, wherein the propylene-ethylene copolymer comprises units of propylene and units of ethylene in a weight proportion of 96.4:3.6 to 90:10.

13. The packaging material according to any of claims 1 or 2, wherein the α-olefin is the $C_4$–$C_{10}$ α-olefin-propylene copolymer is at least one of butene-1, pentene and hexene.

14. The packaging material according to any of claims 1 or 2, wherein at least one of the surface layers (B) has a thickness of 0.2 to 3 microns.

15. The packaging material according to any of claims 1 or 3, wherein at least one of the surface layers (B) has a thickness of 0.7 to 10 microns.

16. The packaging material according to any of claims 1 or 2, wherein at least one of the surface layers (B) comprises further a low molecular weight thermoplastic resin in an amount of 25 to 3 parts by weight to 100 parts by weight of the combined amount of the blend and the low molecular weight thermoplastic resin.

17. The packaging material according to any of claims 1 or 2, wherein the base layer (A) comprises the propylene polymer and the low molecular weight thermoplastic resin in a weight proportion of 80:20 to 98:2 and at least one of the surface layers (B) comprises the blend and the low molecular weight thermoplastic resin in a weight proportion of 75:25 to 97:3.

18. The packaging material according to claim 17, wherein the base layer (A) comprises further 0.5 to 3 parts by weight of an antistatic agent and 0.1 to 3 parts by weight of at least one of a lubricant and an anti-blocking agent per 100 parts by weight of the combined amount of the propylene polymer and the low molecular weight thermoplastic resin and at least one of the surface layers (B) comprises further 0.5 to 3 parts by weight of an antistatic agent and 0.1 to 3 parts by weight of at least one of a lubricant and an anti-blocking agent per 100 parts by weight of the combined amount of the blend and the low molecular weight thermoplastic resin.

19. The packaging material according to claim 18, wherein at least one of the surfaces is subjected to electric discharge treatment and has a wetting tension of 30.5 to 58 dyne/cm.

* * * * *